United States Patent Office 2,704,293
Patented Mar. 15, 1955

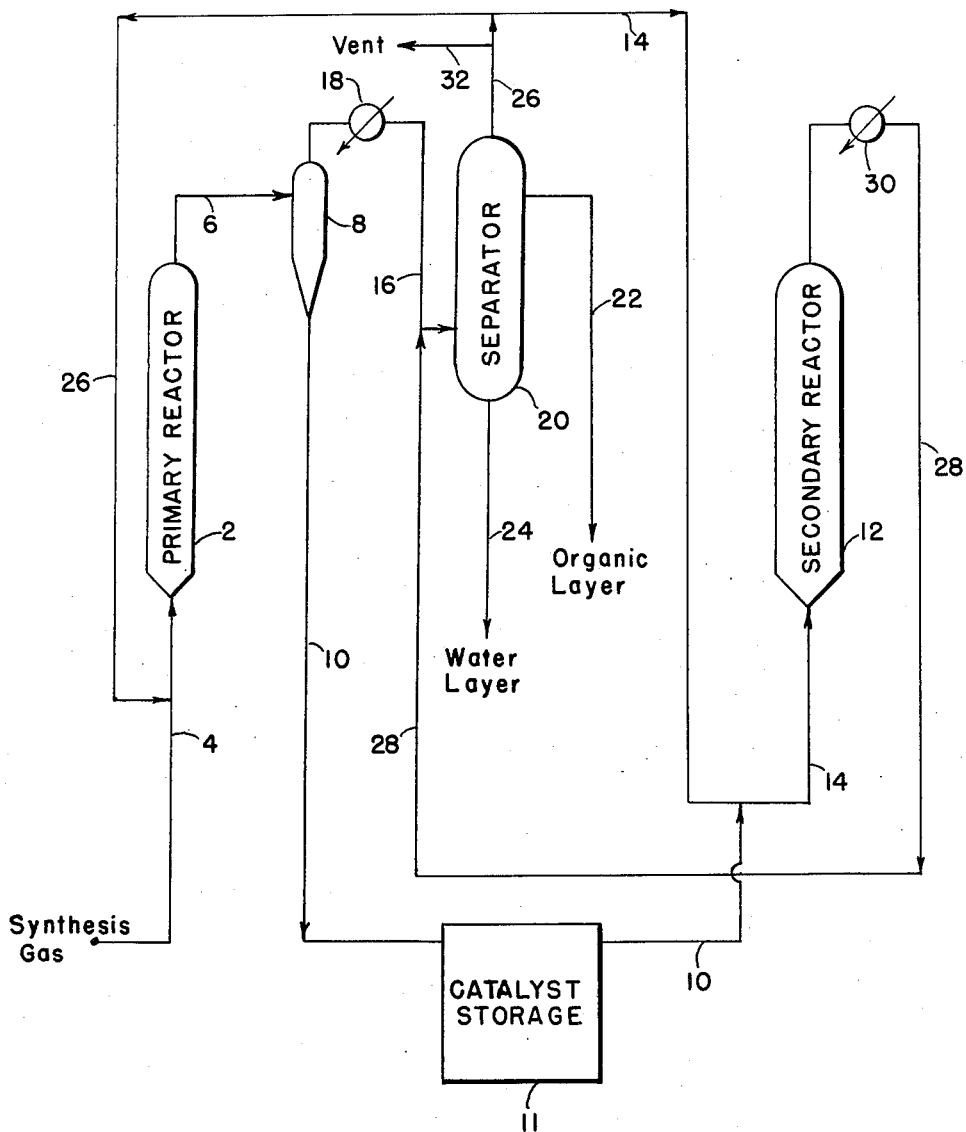

2,704,293

PREPARATION OF HIGHLY ACTIVE HYDRO-CARBON SYNTHESIS CATALYST

Myron B. Kratzer, Tulsa, Okla., assignor to Stanolind Oil and Gas Company, Tulsa, Okla., a corporation of Delaware Application October 28, 1949, Serial No. 124,087

5 Claims. (Cl. 260—450)

The present invention relates to a method of obtaining a highly active hydrocarbon synthesis catalyst and to a process for the utilization of such a catalyst after it has been prepared. More particularly, it pertains to a method for preparing a highly active iron type hydrocarbon synthesis catalyst under conditions normally considered to be undesirable for overall optimum efficiency of the synthesis system.

It has previously been taught that excessive carbon and wax deposition on a hydrocarbon synthesis catalyst with attendant fragmentation or attrition thereof while in the form of a fluidized bed in the reaction zone is a condition that should be avoided to as great an extent as possible. One of the chief difficulties encountered in ordinary synthesis procedures when wax or carbon deposition becomes excessive resides in the fact that the density of the fluidized catalyst bed decreases to such an extent that the percentage of synthesis gas transformed into useful products falls below conversion levels at which it is economical to operate. Furthermore, such conditions result in an increased tendency toward elutriation and in a decreased heat transfer coefficient usually necessitating termination of the run.

It is an object of my invention to prepare a synthesis catalyst from a standard high density catalyst by subjecting the latter to conditions which favor excessive deposition of carbon on the catalyst together with fragmentation of the resulting carbonized material. It is a further object of my invention to employ the highly active catalyst obtained in this manner in a separate synthesis reactor operating in conjunction with a second reactor wherein the latter employs a standard high density iron-type hydrocarbon synthesis catalyst and fresh synthesis gas, while said separate synthesis reactor utilizes as synthesis gas, the tail gas from said second reactor.

I have now discovered, contrary to prior belief, that a hydrocarbon synthesis catalyst when treated under conditions conducive to high wax and carbon deposition for a sufficient length of time becomes extremely active and that a catalyst so produced can be utilized in fluidized form over extended periods with excellent results. In carrying out the process of my invention, a standard iron high density hydrocarbon synthesis catalyst is charged to a fluid bed type synthesis reactor of conventional design after which the reactor is operated under conditions which favor high carbon deposition. Thus, in accomplishing this object, synthesis is effected by operating at temperatures of from about 550° to 700° F., low hydrogen partial pressures which can be most conveniently secured by operating at low total pressures, i. e., about 250 p. s. i. or below, for example, 100 to 150 p. s. i, and low $H_2:CO$ ratios, i. e., a total feed having about three volumes of hydrogen to one of carbon monoxide, or less. Linear velocities of about 0.5 to about 2.0 ft./sec. and space velocities of from about 4.0 to about 15 and preferably from about 7.0 to 9.0 S. C. F. H. CO/lb. Fe may be employed. As the deposition of carbon on the catalyst becomes apparent, as is generally the case after about 250 hours, relatively rapid fragmentation of the catalyst occurs and the resulting finely divided catalyst (a large portion of which has an average particle size of from about 0 to about 20 microns) of high carbon content, i. e., the catalyst may contain up to about 70 per cent carbon, elutriates and is transferred to a second synthesis reactor. It should be noted that maximum carbon deposition occurs prior to maximum fragmentation of the catalyst and that both of these phenomena generally occur before a highly active catalyst is secured. Operation of the first reactor is continued until substantially all of the catalyst has disintegrated after which it is withdrawn from the unit and conveyed to the second reactor. In this connection it should be pointed out that I employ, in a preferred embodiment of my invention, a second reactor which contains only a few heat transfer tubes, thus necessitating the preparation of the finely divided catalyst in the first or primary reactor which is equipped to handle the heat evolved during this step. Fresh standard iron-type high density catalyst is then charged to the first reactor and thereafter the two reactors are operated simultaneously, the second one employing as synthesis gas, the effluent from the first or primary reactor. In the first reactor, a major portion of the synthesis gas is generally converted and, accordingly, most of the heat evolution occurs therein. Conversion of synthesis gas to useful products in the first reactor, however, is preferably limited to between about 50 and 75 per cent of that obtained under customary conditions and, as a result, extended operation of the unit is possible without excessive deposition of carbon and wax. Also, by operating at reduced conversions in the first reactor, the life of the catalyst employed therein is greatly increased. Operation of the first reactor at less than normal conversions may be effected by increasing the space velocity to from about 13 to 20 S. C. F. H. CO/lb. Fe, or higher, depending on the degree of conversion desired. In the second reactor, which contains the highly active low density catalyst referred to above, the remaining portion of the desired degree of conversion can be effected. In this reactor, however, little or no heat transfer is required since only a relatively small portion of the conversion occurs therein and since a large amount of effluent gases from the first reactor which contain, in addition to carbon monoxide and hydrogen, methane, ethane, carbon dioxide, propane, and butane, serve to remove effectively the heat of reaction as sensible heat. In addition, catalyst elutriation may, if desired, be controlled by employing a second reactor of greater diameter than the primary reactor thereby lowering the gas velocity through the former. Alternatively, only a portion of the primary reactor effluent gas may be sent to the second reactor, recycling the remainder, after condensation of the primary product gases, directly to the first reactor. By this expedient, a smaller second reactor is required and therefore results in a system which, under certain circumstances, may be generally more economical and desirable.

The catalyst utilized in carrying out my invention may be any of those known to the art such as iron pyrites, fused iron oxide, various high purity iron ores, bloom scale, and mill scale. In the majority of instances, however, I prefer to employ mill scale. This material is generally preferably ground so that it has a particle size distribution of about 25%—100 mesh, 25%—140 mesh, 25%—200 mesh, and 25%—325 mesh, after which it is impregnated with a solution of potassium carbonate in an amount sufficient to deposit about 0.5 per cent potassium oxide (iron-basis) thereon. The material thus prepared is then charged to a suitable synthesis reactor (fluid bed type) and reduced with hydrogen under the following typical conditions:

Pressure_____ 150 p. s. i. g.
Temperature_____ 700° F.
Linear velocity_____ 0.71 ft./sec.
Space velocity_____ 24.7 S. C. F. H. $H_2$/lb. Fe.

After production of water can no longer be detected, reduction is considered to be complete and the catalyst thus prepared is ready for use.

The process of my invention may be further illustrated by reference to the accompanying flow diagram wherein fresh hydrocarbon synthesis catalyst is first charged to primary reactor 2 after which catalyst in the form of a fluid bed is contacted with fresh synthesis gas introduced through line 4. The conditions employed initially in this reactor are those which are known to be favorable to high wax and carbon deposition and have been noted above. Product gases emanate from the top of primary reactor 2 through line 6 are sent to cyclone separator 8 together with entrained catalyst fragments which are withdrawn through line 10 to catalyst storage 11 and later sent to secondary reactor 12 via line 14. The effluent gases are withdrawn from separator 8 through line 16 and cooler 18 and thereafter introduced into separator 20 where the resulting condensate separates into two layers, the organic and water layers being withdrawn through lines 22 and 24, respectively, for further processing outside the scope of this invention. The uncondensed gases during this period of preparing catalyst for reactor 12 are withdrawn from separator 20 through line 26 and returned to primary reactor 2 via line 4 until substantially all of the catalyst initially charged is converted into a finely divided material of high carbon content. After the latter has been removed from primary reactor 2, fresh high density catalyst is charged thereto and hydrocarbon synthesis is effected therein under conditions favorable to long catalyst life and high fluid bed density, i. e., temperatures in the neighborhood of about 600° F., a fresh feed containing hydrogen and carbon monoxide in a ratio of from about 1.8:1 to about 2.6:1, a recycle gas containing hydrogen and carbon monoxide in a ratio of from about 4:1 to about 25:1, a linear velocity of from about 0.5 to about 2.0 ft./sec., a space velocity of from about 13 to 20 S. C. F. H. CO/lb. Fe, and a pressure of from about 350 to about 550 p. s. i. g. Catalyst for reactor 12 is withdrawn from temporary catalyst storage unit 11 and sent through line 10 to line 14 where it is mixed with tail gas from separator 20 and synthesis effected in reactor 12 under the following approximate conditions:

Pressure _____ 350–550 p. s. i. g.
Temperature _____ 560°–680° F.
Linear velocity _____ 0.10–0.70 ft./sec.
Space velocity _____ 7.0–13.0 S. C. F. H. CO/lb. Fe.
Fresh feed composition _____ {30.0–50.0 volume percent $H_2$.
                                   { 5.0–12.0 volume percent CO.

During synthesis, under conditions given immediately above, product gases from reactor 12 are withdrawn through line 28 and cooler 30 and the condensate thus obtained returned to separator 20. The uncondensed gases in the separator are withdrawn through line 26 and, if desired, all of them may be returned to reactor 12 via line 14 or the stream may be split and a portion of the gases recycled to reactor 2. Periodically, uncondensed gases may be vented to the atmosphere through line 32.

The examples which follow serve to further illustrate the increase in catalyst activity with increasing carbon content and attrition thereof.

EXAMPLE I

A hydrocarbon synthesis catalyst was prepared from mill scale in accordance with the procedure described above. After the reduction step in the initial treatment of the catalyst appeared to be complete, the temperaure was lowered to 600° F. Synthesis gas containing hydrogen and carbon monoxide in a ratio of 2.6:1 was next introduced after which the following operating conditions were maintained throughout a period of 118 hours.

Pressure _____ 250 p. s. i. g.
Temperature _____ 600° F.
Linear velocity _____ 0.79 ft./sec.
Space velocity _____ 5.0 S. C. F. H. CO (fresh feed)/lb. Fe.
Recycle ratio _____ 1.80.
Fresh feed composition _____ {66.3 volume percent $H_2$.
                                   {25.3 volume percent CO.

Following this period, the fresh feed gas $H_2$:CO ratio was lowered to 1.77, the pressure was decreased to 150 p. s. i. g., and the fresh feed velocity was held constant. The following average conditions were then maintained throughout the run which lasted 446 hours.

Pressure _____ 150 p. s. i. g.
Temperature _____ 600°–660° F.
Linear velocity _____ 0.80 ft./sec.
Space velocity _____ 7.2–21.2 S. C. F. H. CO (total feed)/lb. Fe
Recycle ratio _____ 1.8.
Fresh feed composition _____ {60.2 volume percent $H_2$.
                                   {32.7 volume percent CO.

The results obtained by operating under these conditions are indicated in the table below.

Table I

| | | | | | | | | | | |
|---|---|---|---|---|---|---|---|---|---|---|
| Average age of run, hours | 38 | 134 | 184 | 232 | 277 | 324 | 374 | 446 | | |
| Average temperature, °F | 600 | 600 | 600 | 620 | 640 | 640 | 660 | 600 | | |
| Pounds of original iron charge fluidized | 197.8 | 138.1 | 126.0 | 100.7 | 81.2 | 66.3 | 57.4 | 39.3 | | |
| Conversion CO (total feed) | 63.7 | 68.6 | 64.2 | 63.9 | 67.9 | 76.0 | 84.7 | 82.3 | | |
| Percent CO converted to: | | | | | | | | | | |
| $CO_2$ | 15.7 | 22.1 | 23.4 | 19.7 | 23.9 | 17.9 | 16.2 | 19.1 | | |
| $C_1$ and $C_{2's}$ | 21.7 | 13.2 | 12.5 | 13.4 | 12.9 | 13.1 | 17.6 | 13.6 | | |
| $C_3$ and $C_4$ olefins | 18.6 | 15.4 | 14.3 | 13.7 | 13.7 | 12.1 | 13.3 | 12.4 | | |
| $C_3$ and $C_4$ paraffins | 4.0 | 2.6 | 3.0 | 2.9 | 2.0 | 5.6 | 4.9 | 2.7 | | |
| $C_5$ and heavier | 30.8 | 40.2 | 41.0 | 44.8 | 41.6 | 45.0 | 42.4 | 45.9 | | |
| Water soluble chemicals | 9.1 | 6.4 | 5.9 | 5.4 | 5.9 | 6.3 | 5.7 | 6.3 | | |
| Catalyst age, hours | 2 | 54 | 83 | 154 | 202 | 250 | 321 | 369 | 401 | 443 |
| Analysis of catalyst, wt. percent: | | | | | | | | | | |
| Fe, total | 73.5 | 96.6 | 87.5 | 83.1 | 79.8 | 77.8 | 61.0 | 45.8 | 38.8 | 34.4 |
| C | | | 8.0 | 10.2 | 10.1 | 13.3 | 25.4 | 36.5 | 41.6 | 41.2 |
| Wax | | | 1.4 | 2.7 | 3.4 | 5.5 | 12.6 | 14.5 | 16.6 | 21.9 |
| $K_2O$ | 0.49 | 0.45 | | | | | | | | |

EXAMPLE II

After a preliminary treatment similar to that described in Example I, the resulting mill scale catalyst was subjected to the following conditions for 120 hours to insure the procurement of a catalyst having uniform properties.

Pressure _____ 246 p. s. i. g.
Temperature _____ 600° F.
Linear velocity _____ 0.75 ft./sec.
Space velocity _____ 5.0 S. C. F. H. CO (fresh feed)/lb. Fe.
Recycle ratio _____ 1.8.
Fresh feed composition _____ {69.4 volume percent $H_2$.
                                   {27.0 volume percent CO.

Thereafter the fresh feed $H_2$:CO ratio was lowered to 1.9. The superficial linear velocity was lowered to 0.63 ft./sec. by reducing the fresh feed rate. The following conditions were then maintained for the duration of the run which lasted 995 hours.

Pressure _____ 240–248 p. s. i. g.
Temperature _____ 560°–683° F.
Linear velocity _____ 0.59–0.65 ft./sec.
Space velocity _____ 7.4–12.4 S. C. F. H. CO (total feed)/lb. Fe.
Recycle ratio _____ 1.76–1.85.
Fresh feed composition _____ {63.8–65.7 volume percent $H_2$.
                                   {32.8–34.6 volume percent CO.

By operating under the above specified conditions, the results obtained are indicated in the table below.

Table II

| Average age of run, hrs. | Average Temp., °F. | Pounds of original iron charge fluidized | Conversion CO (total feed) | Percent CO converted to— | | Catalyst age, hrs. | Analysis of Catalyst, wt. percent | | | |
|---|---|---|---|---|---|---|---|---|---|---|
| | | | | $CO_2$ | $C_3$ and $C_4$ olefins | | Fe, total | C | Wax | $K_2O$ |
| 19 | 605 | 146.0 | 64.6 | 11.7 | 17.3 | 0 | 96.1 | | | 0.27 |
| 115 | 599 | 142.5 | 67.8 | 11.8 | 18.2 | 16 | 88.0 | 7.5 | 0.6 | |
| 163 | 602 | 133.5 | 69.5 | 14.2 | 17.2 | 64 | 86.7 | 7.8 | 0.8 | |
| 239 | 620 | 121.7 | 74.3 | 15.4 | 18.4 | 136 | 86.5 | 8.9 | 1.3 | |
| 283 | 641 | 115.5 | 74.1 | 14.1 | 15.8 | 208 | 83.7 | 10.3 | 1.7 | |
| 355 | 660 | 110.5 | 76.1 | 13.2 | 13.8 | 232 | 83.0 | 10.4 | 2.0 | |
| 427 | 683 | 104.9 | 76.7 | 14.6 | 16.6 | 304 | 81.9 | 12.3 | 2.3 | |
| 499 | 601 | 90.3 | 74.4 | 17.2 | 14.8 | 376 | 79.9 | 14.0 | 2.6 | |
| 581 | 582 | 94.0 | 69.4 | 19.4 | 16.3 | 448 | 76.6 | 17.5 | 3.0 | |
| 653 | 561 | 85.9 | 65.6 | 20.6 | 15.0 | 520 | 73.0 | 17.5 | 4.9 | |
| 726 | 561 | 78.9 | 59.4 | 19.7 | 14.2 | 602 | 73.4 | 19.0 | 5.2 | |
| 797 | 560 | 72.8 | 52.5 | 22.9 | 13.1 | 650 | 72.2 | 17.8 | 6.0 | |
| 869 | 561 | 67.4 | 51.6 | 24.1 | 13.8 | 723 | 70.2 | 16.5 | 7.1 | |
| 904 | 564 | 69.5 | 73.5 | 17.7 | 14.8 | 794 | 70.9 | 18.5 | 7.8 | |
| 921 | 562 | 68.8 | 74.0 | 18.0 | 17.4 | 866 | 68.2 | 17.7 | 9.3 | |
| 943 | 562 | 65.4 | 79.7 | 13.5 | 18.7 | 899 | 67.9 | 17.2 | 11.7 | |
| 967 | 559 | 61.5 | 80.9 | 13.7 | 17.7 | 964 | | 18.1 | 12.2 | |
| | | | | | | 995 | 66.6 | 18.7 | 11.7 | |

In both of the foregoing examples it will be seen that under conditions which favor excessive carbon deposition, a catalyst of increased activity is obtained. Thus, for example, in Table I, it is shown that an increase of conversion of about 9 per cent is realized at 640° F. with an increase in carbon content of from 10.1 per cent at 277 hours to 13.3 per cent at 324 hours. It is also to be noted that at the termination of the run (446 hours), with 41.2 per cent of the catalyst consisting of carbon, a carbon monoxide conversion of 82.3 per cent is obtained at only 600° F. and with only 39.3 lbs. of catalyst fluidized in the reactor or 19.8 per cent of the original catalyst charge. These results compare most favorably with a carbon monoxide conversion of 84.7 per cent obtained at 660° F. after 374 hours where 57.4 lbs. of catalyst remained fluidized but contained only about 36.5 per cent carbon. Similarly, it is to be noted that in Table II at temperatures in the neighborhood of 560° F., the carbon monoxide conversion increased from 51.6 per cent at 869 hours to 73.5 per cent at 904 hours. The last three test periods indicated in the table showed even higher percentage conversions with the last test period indicating a carbon monoxide conversion of 80.9 per cent. It is significant to note that the sudden substantial increase in carbon monoxide conversion between the fourth and fifth test periods before the end of the run occurred when a maximum percentage of both carbon and catalyst fragments (fines ranging in particle size from about 0 to about 20 microns) were present in the reactor. It is likewise important to note that in Example I the increase in catalyst activity occurred much more rapidly than in Example II owing to the fact that the conditions employed in Example I favored higher carbon deposition rates, namely, lower pressures and a lower ratio of hydrogen to carbon monoxide in the fresh feed.

The data in the table below also support the teachings of the foregoing examples to the effect that catalyst activity increases with increasing carbon content. This information further indicates that the activity of hydrocarbon synthesis catalyst prepared in accordance with my invention varies directly with the particle size of the catalyst. In securing these data, eighteen catalyst samples were selected from eleven different runs.

The following table summarizes the results of chemical and particle size analyses on the eighteen samples referred to above together with the corresponding activities of the catalyst expressed as lb. moles carbon monoxide converted/hr.-lb. Fe-log mean carbon monoxide partial pressure, p. s. i. It must be emphasized that no completely satisfactory criterion of catalyst activity independent of all operating variables has so far been found; however, the one employed here, i. e., lb. moles carbon monoxide converted/hr.-lb. Fe-log mean carbon monoxide partial pressure, p. s. i., is, from my observations, the best available. The data in the table illustrate a general increase in catalyst activity with increasing carbon content and increasing content of 0–20 micron material, and, especially, unusually high activities when the carbon content is about 30 per cent or above.

Table III

| Percent carbon | Particle Size—Percent 0–20μ | Catalyst Activity—lb. mole CO converted × 10⁴ hr. × lb. Fe × log mean CO partial pressure |
|---|---|---|
| 60.0 | 80.1 | 41.2 |
| 38.1 | 51.5 | 18.5 |
| 31.4 | 27.8 | 14.2 |
| 24.3 | 23.1 | 8.18 |
| 18.1 | 4.5 | 9.22 |
| 16.2 | 2.0 | 7.25 |
| 15.9 | 4.1 | 8.69 |
| 14.6 | 1.8 | 7.78 |
| 13.5 | 1.5 | 6.30 |
| 13.2 | 2.5 | 3.68 |
| 12.3 | 1.0 | 7.95 |
| 11.4 | 2.3 | 2.99 |
| 11.3 | 4.7 | 3.22 |
| 11.0 | 2.5 | 4.17 |
| 10.9 | 2.9 | 4.66 |
| 9.9 | 1.5 | 3.16 |
| 9.8 | 2.1 | 2.36 |
| 9.5 | 3.3 | 3.83 |

It will be apparent from the above data that highly active catalysts are produced when the carbon content of the catalyst ranges from at least about 25 weight per cent to about 70 weight per cent and that such catalysts are characterized by relatively high percentages of low average particle size material, i. e., 0–20 micron particles. Generally, I have found that catalyst produced in the manner herein disclosed, having a carbon content not substantially less than 30 per cent, preferably from about 30 weight per cent to about 60 weight per cent, and having present therein at least about 25 to 30 per cent of 0–20 micron catalyst particles, are capable of converting carbon monoxide and hydrogen to useful products in high yields over extended periods of time.

In connection with the activity of hydrocarbon synthesis catalysts, in general, I have observed that catalyst which is in the process of achieving equilibrium with the synthesis gas is not as effective as one already in equilibrium therewith. For example, in normal synthesis operation, the fresh synthesis gas charged to the reactor is a more reducing gas than that found in the upper portion of the synthesis unit. Accordingly, fresh catalyst functions most efficiently when it comes in contact with fresh or reducing synthesis gas; however, gas as it travels up the reactor becomes more of an oxidizing gas owing to the presence of increasing amounts of water therein and hence the catalyst with which said gas comes in contact is converted into a less reduced state and is therefore more nearly in equilibrium with the oxidizing gas surrounding it. In the conventional hydrocarbon synthesis reactor system, longitudinal mixing of the catalyst occurs to a considerable extent; and, under such conditions, it will be apparent that the less oxidized, or fresh synthesis gas, contacts the less reduced catalyst and the oxidizing gas contacts highly reduced catalyst, a condition which I have found should be avoided in so far as possible. One of the particularly outstanding features of my invention, therefore, resides in the fact that the highly active catalyst produced in accordance therewith, being in a less reduced state than that originally charged to the reactor, is more nearly in equilibrium with the gas in the upper portion thereof. Thus, by conducting the tail gas, or the gas present in the upper zone of the reactor to a second reactor containing only finely divided catalyst prepared in accordance with my invention, or otherwise contacting said tail gas with said finely divided catalyst, substantially ideal conditions are provided for optimum conversion of such gas.

The expression "synthesis gas" as used herein is intended to mean gas containing predominating amounts of hydrogen and carbon monoxide and also is intended to refer to total feed. The percetage of carbon on the catalyst as referred to in the present description means elementary carbon and hence, unless otherwise indicated, includes that derived from wax as well as free carbon.

The process of my invention is susceptible of numerous modifications without departing from the scope thereof. Thus, in some instances, it may prove desirable to prepare the catalyst employed herein in a manner different from that specifically set forth in the present description to obtain a material of similar activity. In general, it may be said that my invention is directed to a process for the synthesis of hydrocarbons from carbon monoxide and hydrogen wherein a catalyst is employed which has been prepared by subjecting any of the conventional iron-type hydrocarbon synthesis catalysts to conditions favorable to excessive carbon and wax formation followed by attrition thereof and thereafter obtaining a highly active finely divided low density catalyst therefrom.

I claim:

1. In a process for the synthesis of valuable organic products by reacting carbon monoxide with hydrogen in the presence of a finely divided fluidized iron catalyst in a reaction zone, the improvement which comprises contacting catalyst with a synthesis gas (total feed) having a $H_2$:CO ratio not substantially in excess of 3:1 at temperatures of from about 550° to about 700° F., and at reactor pressures below about 250 p. s. i., continuing synthesis in said reaction zone under the aforesaid conditions until substantially the entire quantity of the original catalyst charged to said zone has substantially completely disintegrated into a product of much smaller particle size having deposited thereon from about 25 to about 70 per cent of carbon, conveying the resulting low density highly active catalyst to a second reaction zone, charging fresh high density iron catalyst to said first reaction zone and effecting synthesis therein by contacting said catalyst with synthesis gas (fresh feed) having a $H_2$:CO ratio of from about 1.8:1 to about 2.6:1 at synthesis temperatures, at a reactor pressure of from about 350 to about 550 p. s. i. at a space velocity sufficient to convert not more than about 75% of the total feed CO, and withdrawing tail gas from said first reaction zone and introducing said tail gas into said second reaction zone where it contacts a fluidized bed of said finely divided highly active low density catalyst at temperatures of from about 560° to about 680° F. and under other normal synthesis conditions to convert essentially all the carbon monoxide present in said tail gas to useful organic products.

2. In a process for the synthesis of valuable organic products by reacting carbon monoxide with hydrogen in the presence of a finely divided fluidized iron catalyst in a reaction zone, the improvement which comprises contacting catalyst with a synthesis gas (total feed) having a $H_2$:CO ratio not substantially in excess of 3:1 at temperatures of from about 550° to about 700° F. and at reactor pressures of from about 100 to about 150 p. s. i., continuing synthesis in said reaction zone under the aforesaid conditions until substantially the entire quantity of the original catalyst charged to said zone has substantially completely disintegrated into a product of much smaller particle size having deposited thereon from about 25 to about 70 per cent of carbon, conveying the resulting low density highly active catalyst to a second reaction zone, charging fresh high density iron catalyst to said first reaction zone and effecting synthesis therein by contacting said catalyst with synthesis gas (fresh feed) having a $H_2$:CO ratio of from about 1.8:1 to about 2.6:1 at synthesis temperatures, at a reactor pressure of from about 350 to about 550 p. s. i. and at a hydrogen partial pressure of at least about 100 p. s. i. at a space velocity of from about 13 to about 20 S. C. F. H. CO/lb. iron whereby only from about 50 to about 75% of the total feed CO is converted, and withdrawing tail gas from said first reaction zone and introducing said tail gas into said second reaction zone where it contacts a fluidized bed of said finely divided highly active low density catalyst at temperatures of from about 560° to about 680° F. and under other normal synthesis conditions to convert essentially all the carbon monoxide present in said tail gas to useful organic products.

3. In a process for the synthesis of valuable organic products by reacting carbon monoxide with hydrogen in the presence of a finely divided fluidized iron catalyst in a reaction zone, the improvement which comprises contacting said catalyst with a synthesis gas (total feed) having a $H_2$:CO ratio not substantially in excess of 3:1 at temperatures of from about 550° to about 700° and at reactor pressures below about 250 p. s. i., continuing synthesis in said reaction zone under the aforesaid conditions until substantially the entire quantity of the original catalyst charged to said zone has substantially completely disintegrated into a product comprised of particles at least about 30 weight per cent of which have an average particle size of from about 0–20 microns and having deposited thereon from about 25 to about 60 weight per cent of carbon, conveying the resulting low-density highly-active catalyst to a second reaction zone, charging fresh high density iron catalyst to said first reaction zone and effecting synthesis therein by contacting said catalyst with synthesis gas (fresh feed) having a $H_2$:CO ratio of from about 1.8:1 to about 2.6:1 at synthesis temperatures, at a reactor pressure of from about 350 to about 550 p. s. i. and at a hydrogen partial pressure of at least about 100 p. s. i. at a space velocity of from about 13 to about 20 S. C. F. H. CO/lb. iron whereby only from about 50 to 75% of the total feed CO is converted, and withdrawing tail gas from said first reaction zone and introducing said tail gas into said second reaction zone where it contacts a fluidized bed of said finely divided highly active low density catalyst a temperature of from about 560° to about 680° F. and under other normal synthesis conditions to convert essentially all the carbon monoxide present in said tail gas to useful organic products.

4. The process of claim 1 in which the hydrocarbon synthesis catalyst employed is prepared from mill scale.

5. The process of claim 3 in which the hydrocarbon synthesis catalyst employed is prepared from mill scale.

References Cited in the file of this patent

UNITED STATES PATENTS

| | | |
|---|---|---|
| 2,445,796 | Millendorf | July 27, 1948 |
| 2,451,879 | Scharmann | Oct. 19, 1948 |
| 2,461,570 | Roberts | Feb. 15, 1949 |
| 2,467,803 | Herbst | Apr. 19, 1949 |
| 2,489,451 | Dart et al. | Nov. 29, 1949 |
| 2,534,853 | Carkeek | Dec. 19, 1950 |